United States Patent
Porzio et al.

(10) Patent No.: US 12,461,660 B2
(45) Date of Patent: Nov. 4, 2025

(54) DATA BLOCK REFRESH DURING READ ACCESS

(71) Applicant: Micron Technology, Inc., Boise, ID (US)

(72) Inventors: Luca Porzio, Casalnuovo (IT); Ting Luo, Santa Clara, CA (US); Ciro Feliciano, Casandrino (IT); Giuseppe D'Eliseo, Caserta (IT)

(73) Assignee: Micron Technology, Inc., Boise, ID (US)

( * ) Notice: Subject to any disclaimer, the term of this patent is extended or adjusted under 35 U.S.C. 154(b) by 8 days.

(21) Appl. No.: 18/504,985

(22) Filed: Nov. 8, 2023

(65) Prior Publication Data

US 2024/0168654 A1    May 23, 2024

Related U.S. Application Data

(60) Provisional application No. 63/427,353, filed on Nov. 22, 2022.

(51) Int. Cl.
*G06F 3/06* (2006.01)
*G06F 12/1009* (2016.01)

(52) U.S. Cl.
CPC .......... *G06F 3/0619* (2013.01); *G06F 3/0659* (2013.01); *G06F 3/0679* (2013.01); *G06F 12/1009* (2013.01)

(58) Field of Classification Search
None
See application file for complete search history.

(56) References Cited

U.S. PATENT DOCUMENTS

| | | | |
|---|---|---|---|
| 2014/0297944 A1* | 10/2014 | Abe | G06F 3/0647 711/117 |
| 2015/0378800 A1* | 12/2015 | Suzuki | G06F 3/064 714/49 |
| 2021/0278994 A1* | 9/2021 | Yang | G06F 3/0679 |

* cited by examiner

*Primary Examiner* — Charles J Choi
(74) *Attorney, Agent, or Firm* — Holland & Hart LLP

(57) ABSTRACT

Methods, systems, and devices for data block refresh during read access are described. In some instances, when an access command (e.g., a read command) is received, a memory system may determine if the associated block is a PSA block. If the block is PSA block, its data may be provided to a host system to satisfy the read command and the block may either be refreshed or may be designated to be refreshed. For example, the block may be refreshed by copying its data to a write cache and writing the data from the cache to a new block. In other instances, an LBA of the block may be stored (e.g., designated) and the LBA may be refreshed when the memory system is idle.

19 Claims, 6 Drawing Sheets

DATA BLOCK REFRESH DURING READ ACCESS

CROSS REFERENCE

The present Application for Patent claims priority to U.S. Patent Application No. 63/427,353 by Porzio et al., entitled "DATA BLOCK REFRESH DURING READ ACCESS," filed Nov. 22, 2022, which is assigned to the assignee hereof, and which is expressly incorporated by reference herein.

FIELD OF TECHNOLOGY

The following relates to one or more systems for memory, including data block refresh during read access.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

In some cases, a memory device may be written with data prior to being packaged in a memory system. Blocks of memory cells having been written (e.g., pre-loaded) with data may be referred to as production state awareness (PSA) blocks. During manufacturing, the memory device may be attached (e.g., soldered) to a circuit board or other component. The attaching (e.g., soldering) process may expose the memory device to relatively high thermal stresses (e.g., temperatures), which may affect the PSA blocks (e.g., may affect the data stored in the PSA blocks). To mitigate errors caused by the attaching (e.g., soldering) process, memory systems may refresh the PSA blocks during operation. However, such refresh operations routinely occur in the background while other access operations (e.g., read operations, write operations) are being performed. Repeated access operations may introduce additional stresses (e.g., read disturb stresses) to the PSA blocks, which may reduce the cells' read margin and the overall performance of the memory system, among other aspects. Accordingly, a memory system configured to prioritize refreshing PSA blocks that are being accessed may be desirable.

A memory system configured to refresh PSA blocks that are being accessed is described herein. In some instances, when an access command (e.g., a read command) is received, the memory system may determine if the associated block is a PSA block. If the block is PSA block, its data may be copied to multiple locations, both a read cache and a write cache. The data from the read cache may be provided to a host (e.g., a host system) in response to the read command, and the data from the write cache may be written to a new block to effectively refresh the data. Additionally or alternatively, the memory system may utilize a list or table of logical block addresses (LBAs) to refresh the data stored to PSA blocks. For example, if a PSA block is being accessed, its LBA may be stored to a list or table and its data may be provided to a host in response to the read command. During an idle duration, the memory system may refresh the PSA blocks associated with the LBAs stored to the list or table. By refreshing PSA blocks that are being accessed, the overall reliability of the memory system may be improved, among other advantages.

Figure 1:
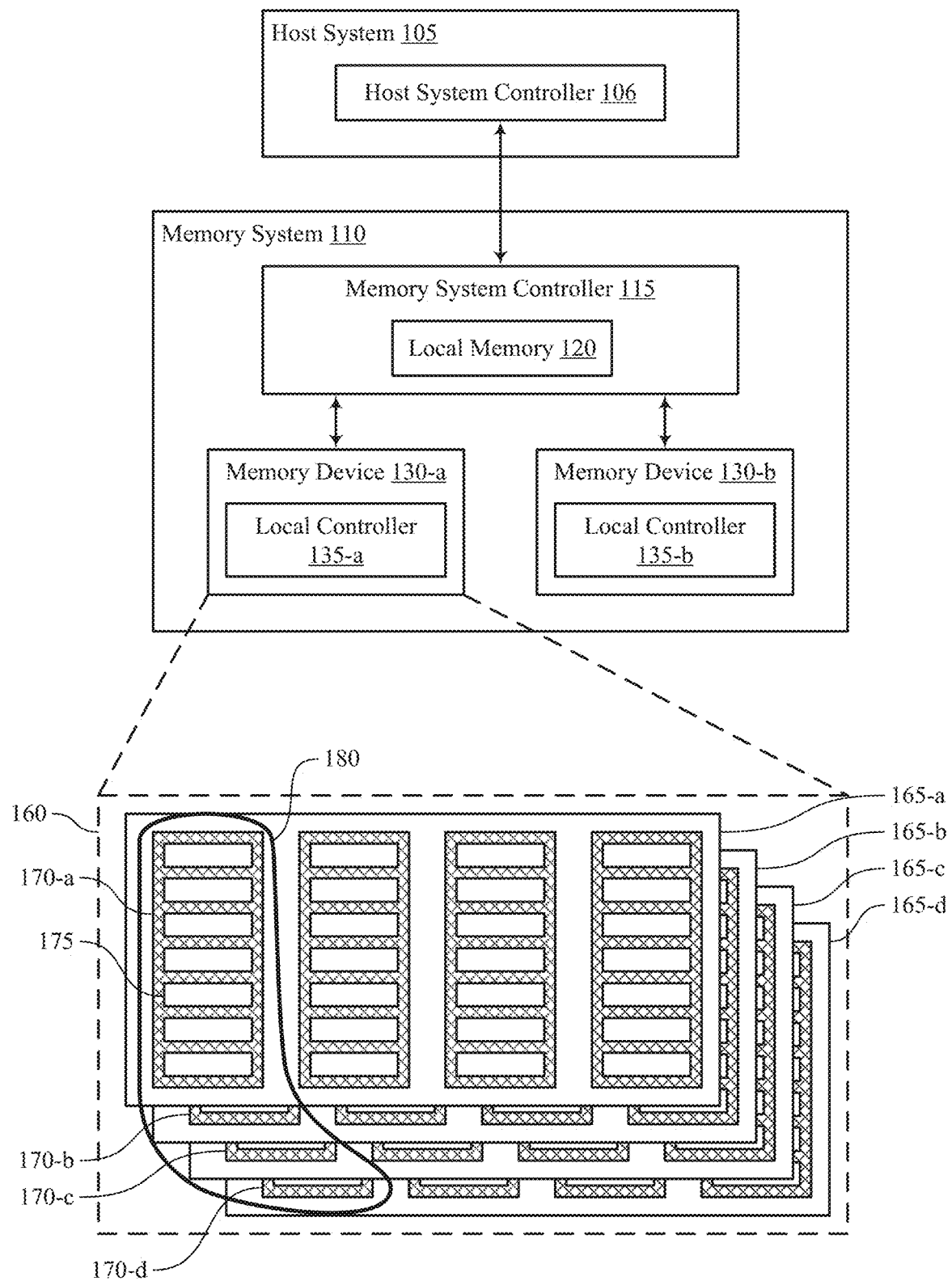
FIG. 1 illustrates an example of a system that supports data block refresh during read access in accordance with examples as disclosed herein.
Figure 2:
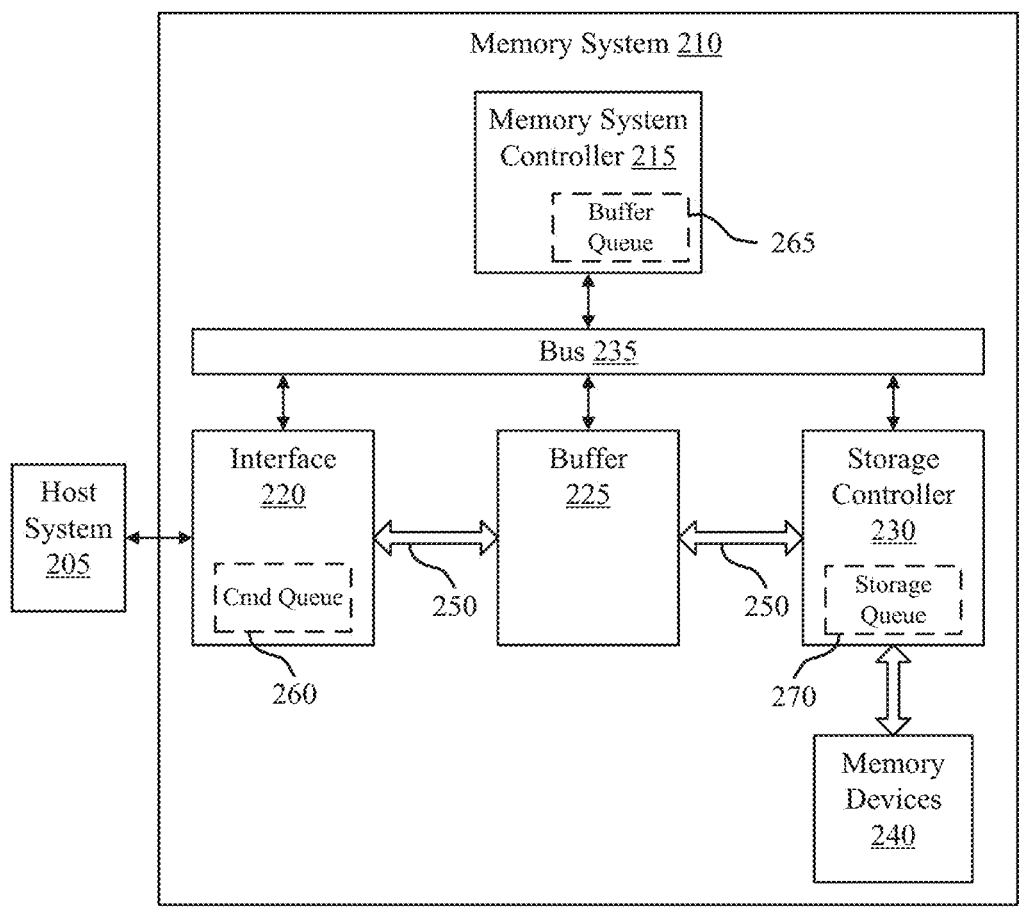
FIG. 2 illustrates an example of a system that supports data block refresh during read access in accordance with examples as disclosed herein.

Features of the disclosure are initially described in the context of systems, devices, and circuits with reference to FIGS. 1 through 2. Features of the disclosure are described in the context of systems and process flow diagrams with reference to FIGS. 3 through 4. These and other features of the disclosure are further illustrated by and described in the context of an apparatus diagram and flowchart that relate to data block refresh during read access with reference to FIGS. 5 through 6.

FIG. 1 illustrates an example of a system 100 that supports data block refresh during read access in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b. 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support data block refresh during read access. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some instances, when an access command (e.g., a read command) is received, the memory system 110 may determine if the associated block 170 is a PSA block. If the block 170 is PSA block, its data may be copied to multiple locations, both a read cache and a write cache. The data from the read cache may be provided to a host system 105 in response to the read command, and the data from the write cache may be written to a new block 170 to effectively refresh the data. Additionally or alternatively, the memory system 110 may utilize a list or table of logical block addresses (LBAs) to refresh the data stored to PSA blocks. For example, if a PSA block is being accessed, its LBA may be stored to a list or table and its data may be provided to the host system 105 in response to the read command. During an idle duration, the memory system 110 may refresh the PSA blocks associated with the LBAs stored to the list or table. By refreshing PSA blocks that are being accessed, the overall reliability of the memory system 110 may be improved, among other advantages.

FIG. 2 illustrates an example of a system 200 that supports data block refresh during read access in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some instances, when an access command (e.g., a read command) is received, the memory system 210 may determine if the associated block is a PSA block. If the block is PSA block, its data may be copied to multiple locations, both a read cache and a write cache. The data from the read cache may be provided to a host system 205 in response to the read command, and the data from the write cache may be written to a new block to effectively refresh the data. Additionally or alternatively, the memory system 210 may utilize a list or table of logical block addresses (LBAs) to refresh the data stored to PSA blocks. For example, if a PSA block is being accessed, its LBA may be stored to a list or table and its data may be provided to the host system 205 in response to the read command. During an idle duration, the memory system 210 may refresh the PSA blocks associated with the LBAs stored to the list or table. By refreshing PSA blocks that are being accessed, the overall reliability of the memory system 210 may be improved, among other advantages.

Figure 3:
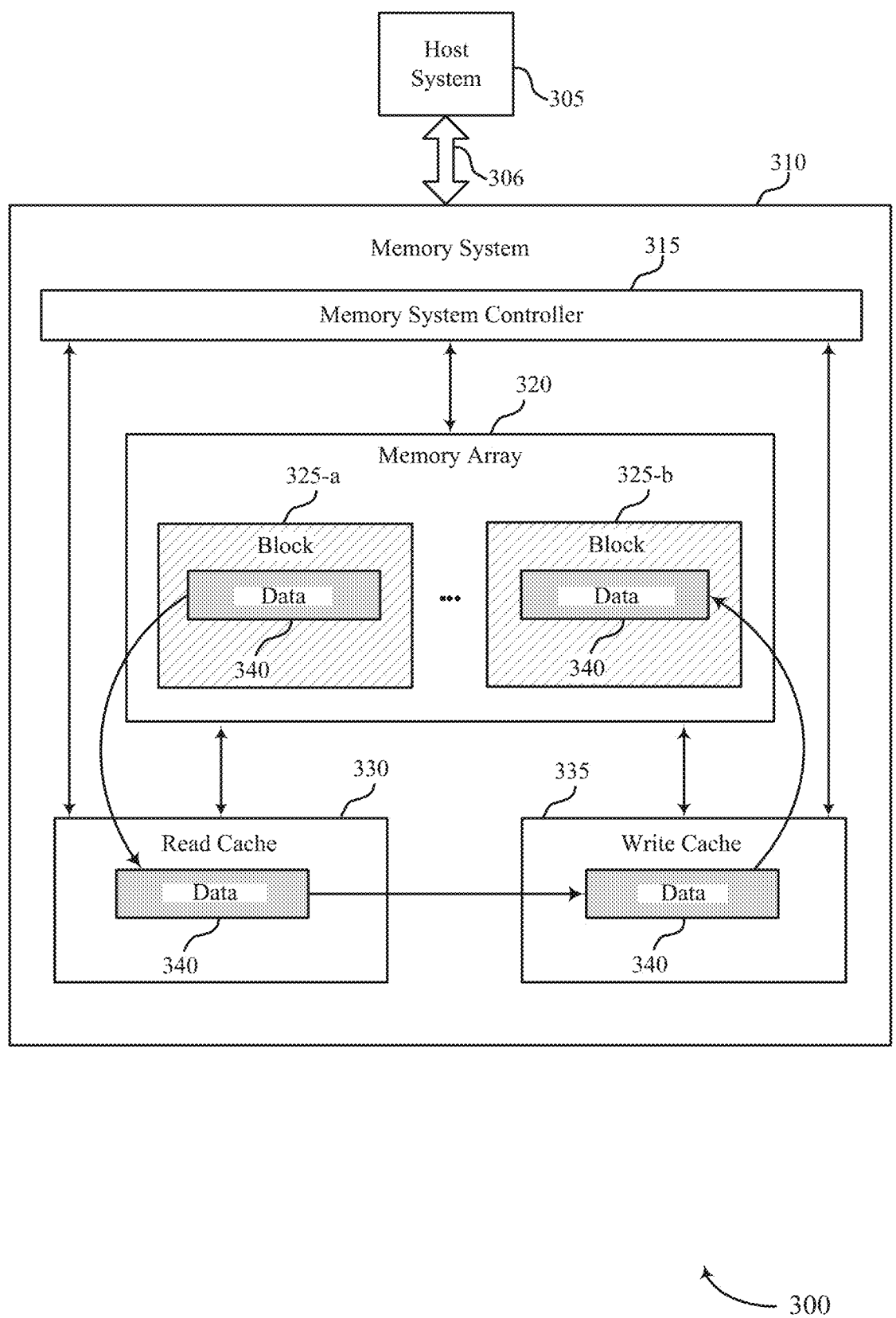
FIG. 3 illustrates an example of a system that supports data block refresh during read access in accordance with examples as disclosed herein.

FIG. 3 illustrates an example of a system 300 that supports data block refresh during read access in accordance with examples as disclosed herein. The system 300 may include a host system 305 and a memory system 310. In some cases, the host system 305 and the memory system 310 may represent a host system 105 or 205 and a memory system 110 or 210, respectively, as described with reference to FIG. 1 and FIG. 2. In some examples, the host system 305 may be coupled with the memory system 310 via an interface 306. The memory system 310 may be configured to refresh PSA blocks that are being accessed (e.g., by the host system 305), which may improve the overall reliability of the memory system 310.

The memory system 310 may include a memory array 320 that includes one or more blocks 325 of non-volatile memory cells. For example, the memory array 320 may include at least a block 325-a a block 325-b, and any quantity of intervening blocks 325 in between. For exemplary purposes only, the block 325-a may represent a PSA block and the block 325-*b* may represent a non-PSA block (e.g., a normal block, a fresh block). As used herein, a PSA block may refer to having data pre-loaded before one or more manufacturing operations (e.g., before the memory array 320 is soldered to the memory system 310).

In some instances, the blocks 325 may represent physical blocks of memory cells. For example, the memory cells of block 325-*a* may include memory cells storing one bit of data (e.g., one or more single-level cells (SLCs)), two bits of data (e.g., one or more multi-level cells (MLCs)), three bits of data (e.g., one or more triple-level cells (TLCs)), or four bits of data (e.g., one or more quad-level cells (QLCs)). Additionally, the memory cells of block 325-*b* may include the same or similar memory cells (e.g., memory cells storing one or more bits of data). Each of the blocks 325 may store respective data. For example, the block 325-*a* may store data 340.

The memory system 310 may include a read cache 330 (e.g., a first cache 330) and a write cache 335 (e.g., a second cache 335). In some instances, each of the read cache 330 and the write cache 335 may temporarily store data before, during, or after a respective read or write operation. For example, when data 340 is read from the memory array 320, the data 340 may be temporarily stored at the read cache 330 before being transmitted to the host system 305. Additionally or alternatively, when the data 340 is written to the memory array 320, the data 340 may be temporarily stored at the write cache 335 before being written to the memory array 320. As described herein, the read cache 330 and the write cache 335 may also be used to facilitate refreshing the data stored to a PSA block (e.g., the data 340 stored to the block 325-*a*) as part of an access operation (e.g., a read operation).

In some cases, the memory system controller 315 may be coupled with each of the memory array 320, the read cache 330, and the write cache 335. Accordingly, the memory system controller 315 may perform refresh operations on at least the block 325-*a* of the memory array 320 using at least the read cache 330 and the write cache 335. For example, memory system controller 315 may move (e.g., transfer, copy) the data 340 from the memory array 320 to the read cache 330 and from the memory array 320 to the write cache 335. The memory system controller 315 may also facilitate the data being moved from the read cache 330 to the host system 305 and from the write cache 335 to the memory array 320.

In some instances, the memory system 310 may perform a refresh operation upon powering on (e.g., booting up). For example, the memory system 310 may transition from a first power state (e.g., an "off state," a low power state, a reduced power state) to a second power state (e.g., an "on" state, a normal power state). In some instances, the memory system 310 may perform a refresh operation upon powering on for a first time after being manufactured (e.g., after the memory array 320 is soldered to the memory system 310). As described herein, because the memory array 320 may include one or more PSA blocks, which may have been exposed to relatively high thermal stresses during the manufacturing process, refreshing the PSA blocks of the memory array 320 may mitigate errors or failures due to errors in the data and may otherwise improve the performance of the memory system 310.

When the memory system 310 powers on, the host system 305 may transmit an access command (e.g., a read command) to the memory system 310. Upon receiving the read command, the memory system controller 315 may determine whether the contents of the read command (e.g., the associated data) is associated with a PSA block (e.g., block 325-*a*). In some instances, the memory system controller 315 may store an indication of which blocks are PSA blocks and thus may determine whether the read command is associated with a PSA block using the stored indication. In other examples, the memory system controller 315 may determine that the block is a PSA block due to it storing data or based on an indication received from the host system 305. That is, when the memory system 310 powers on for a first time, only PSA blocks may store data. Thus, the presence of the data may indicate that the block is a PSA block. The memory system 310 may determine whether the block 325-*a* is a PSA block before, during, or after storing data to the read cache 330.

As part of the read operation, the memory system controller 315 may read data from memory cells of the block 325-*a* of the memory array 320. During the read operation, the memory system controller 315 may store the data 340 to the read cache 330. For example, the memory system controller 315 may transfer the data 340 (or a copy of the data) from the block 325-*a* to the read cache 330, and the data may subsequently be transmitted from the read cache 330 to the host system 305 (e.g., via the interface 306) to satisfy the read command. In some instances, the read command may be performed according to one or more aspects of a standard (e.g., a JEDEC standard).

In some cases, the memory system controller 315 may determine that the block 325-*a* is a PSA block. Based on this determination, the memory system 310 (e.g., the memory system controller 315) may refresh the block 325-*a* (or designate the block 325-*a* to be refreshed) as part of the read operation. For example, while the data 340 is stored in the read cache 330, the memory system controller 315 may write a copy of the data 340 from the read cache 330 to the write cache 335. In other instances, the memory system controller 315 may write a copy of the data 340 to both the read cache 330 and the write cache 335 (e.g., the memory system controller 315 may copy the data from the memory array 320 to the read cache 330 and to the write cache 335). In some examples, the copy of the data 340 may be written to the write cache 335 before transmitting the data 340 from the read cache 330 to the host system 305 to satisfy the read command. Additionally or alternatively, the copy of the data 340 may be written to the write cache 335 concurrent with transmitting the data 340 to the host system 305. In yet another example, the copy of the data 340 may be written to the write cache 335 after transmitting at least a portion of the data 340 to the host system 305, but before the read operation is complete.

After the data is stored to the write cache 335, the memory system 310 may schedule a write operation to be performed on the memory array 320. That is, the memory system 310 may schedule a refresh operation that includes writing the data 340 from the write cache 335 to the block 325-*b*. In some examples, the write operation may be scheduled to occur at a specific time (e.g., immediately, after a duration) or during a duration when the memory system 310 is idle. For example, concurrent with or after transmitting at least a portion of the data 340 to the host system 305, the memory system controller 315 may schedule the data 340 to be written to the block 325-*b*. In some examples, the data 340 may be written as one bit per cell (e.g., using a SLC write) and may include reading, by the memory system controller 315, the copy of the data 340 from the write cache 335 and writing the data 340 to the block 325-*b*. In other examples, the write operation may include writing, by the memory system controller 315, a copy of the data 340 to the block 325-*b* and subsequently removing (e.g., erasing) the data from the write cache 335.

After writing the data 340 to the block 325-*b*, the memory system controller 315 may invalidate the block 325-*a*. For example, once the data 340 is written to the block 325-*b*, the memory system controller 315 may erase the original data 340 from the memory cells of the block 325-*a*. In other examples, the memory system controller 315 may erase the data 340 from the block 325-*a* once it is stored in the read cache 330, the write cache 335, or both. That is, in some examples, the block 325-*a* may be invalidated before or after the data 340 is written to the block 325-*b*. In some examples, the memory system controller 315 may not erase the original data 340 from the memory cells of the blocks 325-*a*, or may erase the original data 340 during another operation. For example, the memory system controller 315 may invalidate the block 325-*a* while the original data 340 is stored to the block 325-*a*. Additionally, the memory system controller 315 may remap the address of block 325-*a* to block 325-*b* while the original data 340 is stored to the block 325-*a*. In some cases, the memory system controller 315 may the aforementioned sequence for multiple blocks 325, based on receiving read commands from the host system 305, until all of the PSA blocks of the memory system 310 are refreshed.

In other examples, if the block 325-*a* is determined to be a PSA block, the memory system controller 315 may perform a refresh operation according to a different sequence. For example, upon determining that a block 325 associated with a read operation is a PSA block, the memory system controller 315 determine an LBA of the block 325. The data 340 may be provided to the host system 305 using the read cache 330 as described herein, and the memory system controller 315 may store the LBA or an indication of the LBA to a portion of the memory system 310 (e.g., SRAM, volatile memory). For example, the LBA or the indication of the LBA may be stored to a list (e.g., table) of LBAs in the SRAM of the memory system 310. In some cases, the list of LBAs may include one or more other LBAs associated with respective PSA block. In some instances, the list may be organized according to a priority (e.g., based on respective risk of data loss, temperature stress, value of data, frequency of data access, or a combination thereof) or based on a timestamp associated with the respective read operation for the block. For example, the LBA of the data 340 may have a priority higher, lower, or between the other LBAs of the LBA list.

After the data 340 is transmitted to the host system 305 (e.g., from the read cache 330), the memory system 310 may enter a period of idle time (e.g., a duration of time when no other access operations are occurring or when relatively few access operations are occurring). During the period of idle time, the memory system controller 315 may access (e.g., scan) the list LBAs and may initiate a refresh operation on one or more associated blocks.

Based on scanning the LBA list and initiating one or more refresh operations, the memory system controller 315 may read the data from the block associated with each respective LBA. For example, during the scan the memory system controller 315 may identify the LBA associated with the data 340 of the block 325-*a*, and may store the data 340 in the write cache 335. The data 340 may be written from the write cache 335 to the block 325-*b* to effectively refresh the data. In other instances, the memory system controller 315 may copy the data 340 from the block 325-*a* and may write it directly to the block 325-*b*. In either instance, the data 340 may be erased from the block 325-*a* after it is written to the block 325-*b*. In some examples, the memory system controller 315 may invalidate the block 325-*a* while the original data 340 is stored to the block 325-*a*. Additionally, the memory system controller 315 may remap the address of block 325-*a* to block 325-*b* while the original data 340 is stored to the block 325-*a*

In some cases, the memory system controller 315 may repeat the refresh for each of the LBAs included in the list. For example, based on the duration of idle time, the memory system controller 315 may be able to refresh the data of each block 325 during a single idle duration. Additionally or alternatively, if the period of idle time is relatively short (or if the list of LBAs is relatively long), the memory system controller 315 may refresh a subset of LBAs during a first idle duration and may refresh the additional LBAs during subsequent idle durations.

In some cases, the memory system controller 315 may refresh the data of the blocks 325 in a specific order. For example, the memory system controller 315 may start with the block 325 of the LBA associated with the highest priority, and end with the block 325 of the LBA associated with the lowest priority. In some examples, if the LBA of the block 325-*a* is associated with a relatively high priority, the data of the block 325-*a* may be refreshed (e.g., transferred to the new block 325-*b*) before the data of another PSA block 325 (e.g., associated with a lower priority) is refreshed.

Figure 4:
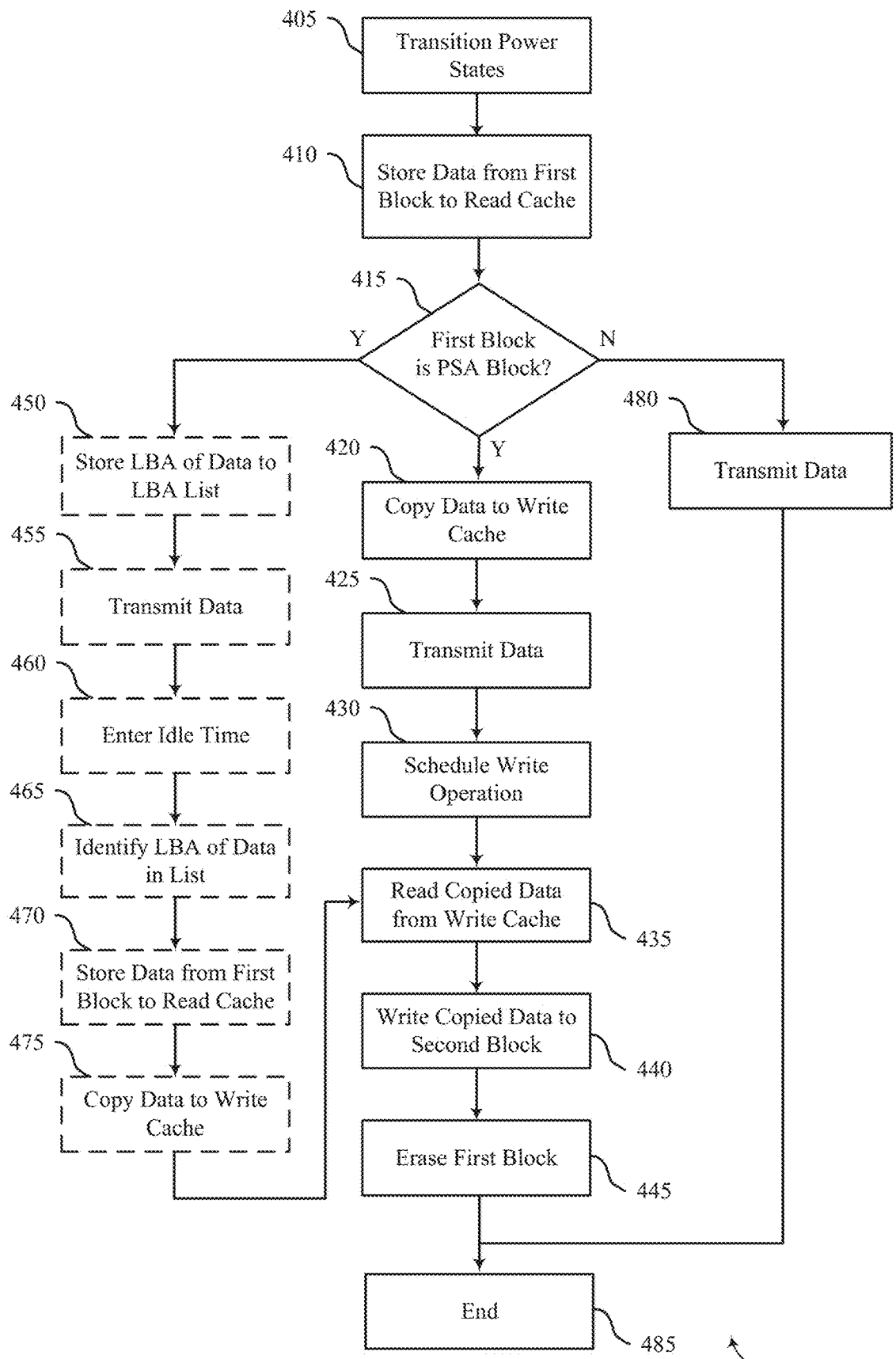
FIG. 4 illustrates an example of a process flow diagram that supports data block refresh during read access in accordance with examples as disclosed herein.

After refreshing one or more blocks 325 during an idle duration, the memory system 310 may invalidate each of the respective PSA blocks 325 which were refreshed during the idle duration. For example, once the data 340 is transferred from the block 325-*a* to the block 325-*b*, the memory system controller 315 may erase the original data 340 from the memory cells of the block 325-*a*. In some cases, the memory system controller 315 may perform the erasing once the data 340 is stored in the read cache 330, the write cache 335, or both. That is, in some examples, the block 325-*a* may be invalidated before the data 340 is written to the new block 325-*b*. In such examples, the memory system controller 315 may erase the respective original data 340 (e.g., from the block 325-*a*) after each respective refresh during the idle duration. Additionally or alternatively, the memory system controller 315 may concurrently or consecutively erase the original data at the end of the respective idle duration. Moreover, after a refresh operation is performed, the memory system controller 315 may update a mapping (e.g., a L2P mapping) to reflect the new location of the data 340. By performing refresh operations as described herein, the overall performance reliability of the memory system 310 may be improved. In some examples, the memory system controller 315 may not erase the original data 340 from the memory cells of the blocks 325-*a*, or may erase the original data 340 during another operation. For example, the memory system controller 315 may invalidate the block 325-*a* while the original data 340 is stored to the block 325-*a*. Additionally, the memory system controller 315 may update the mapping to reflect the new location of the data 340 at the block 325-*b*, while the original data 340 is stored to the block 325-*a*, FIG. 4 illustrates an example of a process flow diagram 400 that supports data block refresh during read access in accordance with examples as disclosed herein. In some examples, the process flow diagram 400 may be implemented by one or more aspects of the systems (e.g., the memory systems) as described with reference to FIGS. 1 through 3. For instance, the process flow diagram 400 may be implemented by a memory system 110 as described with reference to FIG. 1, a memory system 210 as described with reference to FIG. 2, or a memory system 310 as described with reference to FIG. 3. The memory system may be configured to refresh PSA blocks that are being accessed (e.g., by a host system), which may improve the overall reliability of the memory system.

In the following description of the process flow diagram 400, the operations may be performed in different orders or at different times. Some operations may also be omitted from the process flow diagram 400, and other operations may be added to the process flow diagram 400. Additionally, the controller may receive multiple write commands, read commands, repair commands, verification commands, or the like, and different operations of the process flow diagram 400 may be performed based on the received commands as described herein.

Aspects of the process flow diagram 400 may be implemented by a controller (e.g., the memory system controller 315), among other components. Additionally, or alternatively, aspects of the process flow diagram 400 may be implemented as instructions stored in memory (e.g., firmware stored in a memory coupled with a controller). For example, the instructions, in response to being executed by a controller (e.g., the memory system controller 115, 215, or the memory system controller 315), may cause the controller to perform the operation of the process flow diagram 400.

At 405, a memory system (e.g., the memory system 310) may transition power states. As described herein, the memory system may transition from a relatively low power state (e.g., an off state, a hibernate state) to a relatively higher power state (e.g., a normal power state). In some instances, the memory system may transition power states for a first time (e.g., after being manufactured).

At 410, the memory system may store data (e.g., first data) from a block (e.g., a first block) to a read cache based on receiving a read command. In some instances, the memory system may store the data after transitioning power states. In other examples, the memory system may process a portion of the read command before fully transitioning power states.

At 415, the memory system may determine whether the first block is a first block type (e.g., a PSA block) based on performing the read command. In some cases, if, at 415, the memory system determines that the first block is a PSA block, the memory system may follow a first sequence as described at 420 through 445.

At 420, based on determining that the first block is a PSA block, the memory system may write a copy of the data from the read cache to a write cache. As described herein, the memory system may instead write the data directly to the write cache (e.g., from the block) or may write a copy of the data from the read cache.

At 425, the memory system may transmit the data from the read cache to the host system to satisfy the read command. In some cases, the copy of the data may be written to the write cache before transmitting the data to the host system. Additionally or alternatively, the copy of the data may be written to the write cache concurrent with transmitting the data to the host system. In other examples, the copy of the data may be written to the write cache after transmitting at least a portion of the data to the host system, but before the read operation is complete.

At 430, the memory system may schedule the data to be written from the write cache to a second block of non-volatile memory cells. For example, the write operation may be scheduled to occur after the data is transmitted to the host system or during an idle duration, among other possibilities.

At 435, the memory system may start the scheduled write operation. For example, the memory system may read the copy of the data from the write cache.

At 440, the memory system may continue the scheduled write operation. For example, the memory system may write the copy of the data from the write cache to the second block of non-volatile memory cells.

At 445, the memory system may erase or invalidate the first block of non-volatile memory cells. In some cases, the memory system may erase the original data (e.g., the first data stored to the first block) once the data is stored in the read cache, the write cache, or both. That is, in some examples, the first block may be erased before the data is written to the second block. Alternatively, first block may be invalidated while the original data is still stored to the first block.

If, at 415, the memory system determines that the first block is a PSA block, the memory system may follow a second sequence as described at 450 through 475 and 435 through 445.

At 450, the memory system may store an LBA associated with the data of the first block to the memory system (e.g., to SRAM or another volatile memory). For example, the LBA associated with the data of the first block may be stored to a list (e.g., a table). In some cases, the list may include one or more other LBAs that are each associated with a respective set of data at a respective block.

At 455, the memory system may transmit the data from the read cache to the host system to satisfy the read command. In some cases, the LBA may be stored at the LBA list before transmitting the data to the host system. Alternatively, the LBA may be stored at the list concurrent with transmitting the data to the host system. In some other examples, the LBA may be stored at the list after transmitting at least a portion of the data to the host system, but before the read operation is complete.

At 460, the memory system may enter a duration of idle time (e.g., a duration of time when no or relatively few access operations are occurring). The period of idle time may occur after the data is transmitted to the host system, or after one or more access operations subsequent to the transmission.

At 465, and during the idle duration, the memory system may identify the LBA on the LBA list. For example, the memory system may scan at least a portion of the LBA list and identify one or more of the included LBAs.

At 470, for a second time, the memory system may access the first block associated with the identified LBA and store the data of the first block to the read cache of the memory system.

At 475, the memory system may write a copy of the data from the first cache to the second cache. After writing the copy of the data to the second cache, the memory system may perform the steps as described herein at 435 through 445. For example, the memory system may read the copied data from the second cache, write the copied data from the second cache to the second block, and erase or invalidate the first block.

If, at 415, the memory system determines that the first block is a not a PSA block, the memory system may refrain from performing a refresh of the block, as described at 480.

At 480, the memory system may transmit the data from the read cache to the host system, and refrain from performing any refresh operation on the block. Additionally, the memory system may refrain from erasing the data from the block. In some cases, the memory system may repeat the processes depicted by the process flow diagram 400 for another block.

At 485, the refresh operations described herein may be completed and the memory system may end performing read refresh operations. The memory system may be configured to refresh PSA blocks that are being accessed (e.g., by a host system), which may improve the overall reliability of the memory system.

Figure 5:
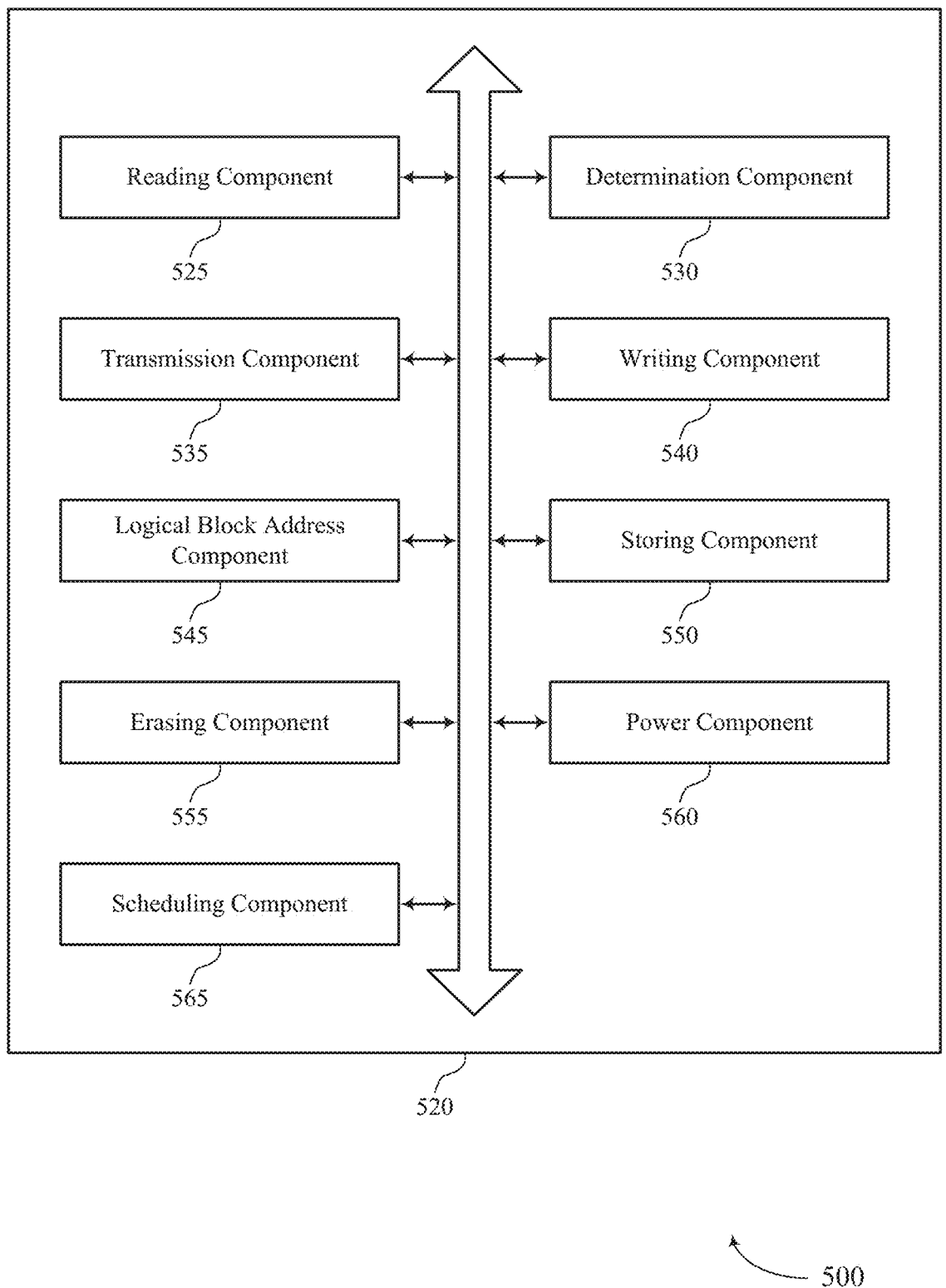
FIG. 5 shows a block diagram of a memory system that supports data block refresh during read access in accordance with examples as disclosed herein.

FIG. 5 shows a block diagram 500 of a memory system 520 that supports data block refresh during read access in accordance with examples as disclosed herein. The memory system 520 may be an example of aspects of a memory system as described with reference to FIGS. 1 through 4. The memory system 520, or various components thereof, may be an example of means for performing various aspects of data block refresh during read access as described herein. For example, the memory system 520 may include a reading component 525, a determination component 530, a transmission component 535, a writing component 540, a logical block address component 545, a storing component 550, an erasing component 555, a power component 560, a scheduling component 565, or any combination thereof. Each of these components may communicate, directly or indirectly, with one another (e.g., via one or more buses).

The reading component 525 may be configured as or otherwise support a means for reading data from a first block of non-volatile memory cells of a memory system. The determination component 530 may be configured as or otherwise support a means for determining whether the first block is associated with a first block type based at least in part on reading the data. The transmission component 535 may be configured as or otherwise support a means for transmitting the data based at least in part on determining whether the first block is associated with the first block type. The writing component 540 may be configured as or otherwise support a means for writing the data to a second block of non-volatile memory cells of the memory system based at least in part on determining that the first block is associated with the first block type.

In some examples, the logical block address component 545 may be configured as or otherwise support a means for storing a logical block address associated with the data to a portion of the memory system based at least in part on determining that the first block is associated with the first block type, where writing the data to the second block of non-volatile memory cells is based at least in part on storing the logical block address.

In some examples, to support writing the data to the second block of non-volatile memory cells, the logical block address component 545 may be configured as or otherwise support a means for identifying, during a first duration, the stored logical block address associated with the data, where the memory system is idle during the first duration. In some examples, to support writing the data to the second block of non-volatile memory cells, the reading component 525 may be configured as or otherwise support a means for reading, for a second time, the data from the first block of non-volatile memory cells based at least in part on identifying the stored logical block address, where the data is written to the second block of non-volatile memory cells during the first duration.

In some examples, the logical block address associated with the data is stored to a list including at least a second logical block address associated with second data. In some examples, the data is written to the second block of non-volatile memory cells before the second data is written to a third block of non-volatile memory cells of the memory system based on respective priorities of the data and the second data.

In some examples, to support reading the data from the first block of non-volatile memory cells, the storing component 550 may be configured as or otherwise support a means for storing the data to a first cache of the memory system, where determining whether the first block is associated with the first block type occurs while the data is stored to the first cache.

In some examples, the writing component 540 may be configured as or otherwise support a means for writing a copy of the data to a second cache of the memory system based at least in part on determining that the first block is associated with the first block type.

In some examples, to support writing the data to the second block of non-volatile memory cells, the reading component 525 may be configured as or otherwise support a means for reading the copy of the data from the second cache. In some examples, to support writing the data to the second block of non-volatile memory cells, the writing component 540 may be configured as or otherwise support a means for writing the copy of the data to the second block of non-volatile memory cells.

In some examples, the erasing component 555 may be configured as or otherwise support a means for erasing, remapping, or invalidating the first block of non-volatile memory cells based at least in part on writing the data to the second block of non-volatile memory cells.

In some examples, the power component 560 may be configured as or otherwise support a means for transitioning, by the memory system, from a first power state to a second power state, where reading the data from the first block of non-volatile memory cells occurs upon transitioning from the first power state to the second power state.

In some examples, the scheduling component 565 may be configured as or otherwise support a means for scheduling the data to be written to the second block of non-volatile memory cells during a second duration based at least in part on determining that the first block is associated with the first block type, where writing the data to the second block of non-volatile memory cells occurs during the second duration.

In some examples, the writing component 540 may be configured as or otherwise support a means for refraining from writing the data to a fourth block of non-volatile memory cells of the memory system based at least in part on determining that the first block is not associated with the first block type.

In some examples, the first block of non-volatile memory cells includes one or more multi-level cells (MLCs), one or more triple-level cells (TLCs), or one or more quad-level cells (QLCs). In some examples, the second block of non-volatile memory cells includes one or more single-level cells (SLCs), one or more multi-level cells (MLCs), one or more triple-level cells (TLCs), or one or more quad-level cells (QLCs).

In some examples, the first block type includes a production state awareness (PSA) block.

Figure 6:
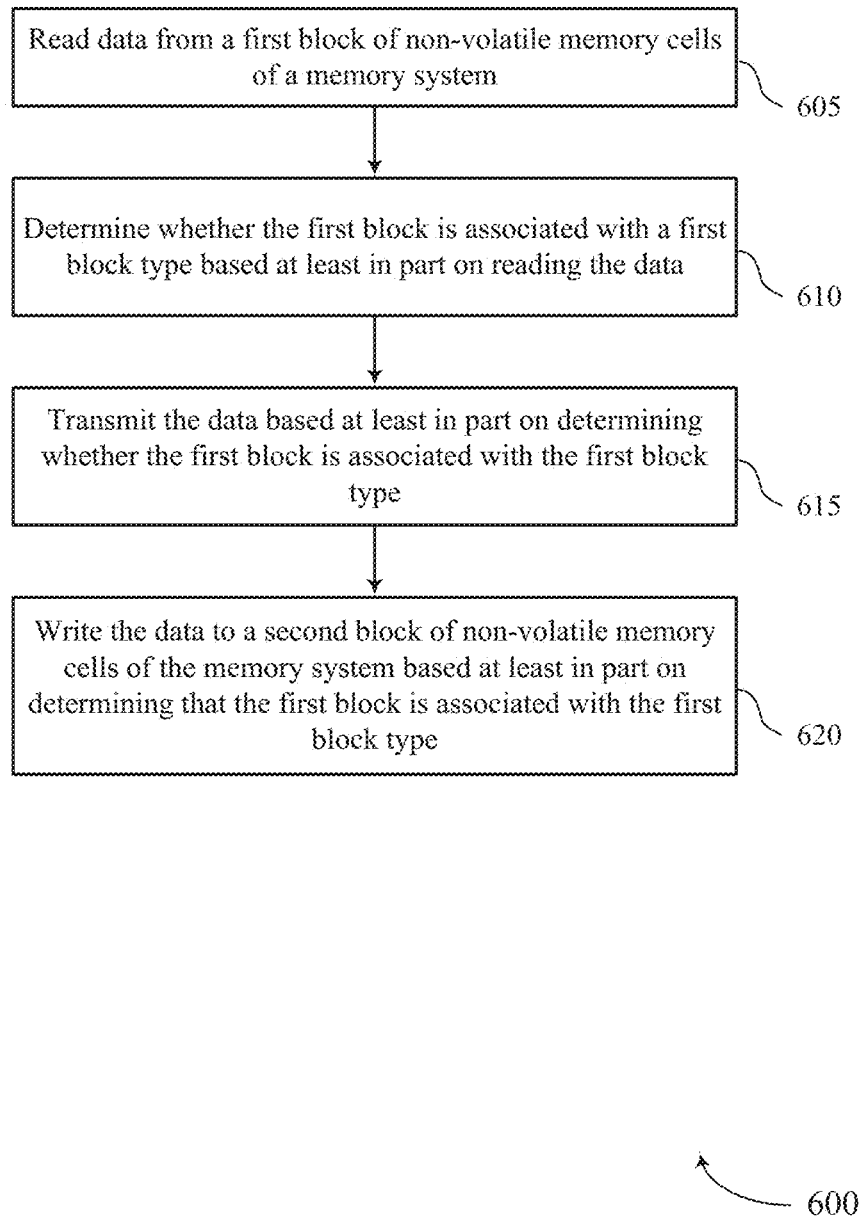
FIG. 6 shows a flowchart illustrating a method or methods that support data block refresh during read access in accordance with examples as disclosed herein.

FIG. 6 shows a flowchart illustrating a method 600 that supports data block refresh during read access in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include reading data from a first block of non-volatile memory cells of a memory system. The operations of 605 may be performed in accordance with examples as disclosed herein. In some examples, aspects of the operations of 605 may be performed by a reading component 525 as described with reference to FIG. 5.

At 610, the method may include determining whether the first block is associated with a first block type based at least in part on reading the data. The operations of 610 may be performed in accordance with examples as disclosed herein. In some examples, aspects of the operations of 610 may be performed by a determination component 530 as described with reference to FIG. 5.

At 615, the method may include transmitting the data based at least in part on determining whether the first block is associated with the first block type. The operations of 615 may be performed in accordance with examples as disclosed herein. In some examples, aspects of the operations of 615 may be performed by a transmission component 535 as described with reference to FIG. 5.

At 620, the method may include writing the data to a second block of non-volatile memory cells of the memory system based at least in part on determining that the first block is associated with the first block type. The operations of 620 may be performed in accordance with examples as disclosed herein. In some examples, aspects of the operations of 620 may be performed by a writing component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for reading data from a first block of non-volatile memory cells of a memory system; determining whether the first block is associated with a first block type based at least in part on reading the data; transmitting the data based at least in part on determining whether the first block is associated with the first block type; and writing the data to a second block of non-volatile memory cells of the memory system based at least in part on determining that the first block is associated with the first block type.

Aspect 2: The method, apparatus, or non-transitory computer-readable medium of aspect 1, further including operations, features, circuitry, logic, means, or instructions, or any combination thereof for storing a logical block address associated with the data to a portion of the memory system based at least in part on determining that the first block is associated with the first block type, where writing the data to the second block of non-volatile memory cells is based at least in part on storing the logical block address.

Aspect 3: The method, apparatus, or non-transitory computer-readable medium of aspect 2, where writing the data to the second block of non-volatile memory cells includes operations, features, circuitry, logic, means, or instructions, or any combination thereof for identifying, during a first duration, the stored logical block address associated with the data, where the memory system is idle during the first duration and reading, for a second time, the data from the first block of non-volatile memory cells based at least in part on identifying the stored logical block address, where the data is written to the second block of non-volatile memory cells during the first duration.

Aspect 4: The method, apparatus, or non-transitory computer-readable medium of any of aspects 2 through 3, where the logical block address associated with the data is stored to a list including at least a second logical block address associated with second data and the data is written to the second block of non-volatile memory cells before the second data is written to a third block of non-volatile memory cells of the memory system based on respective priorities of the data and the second data.

Aspect 5: The method, apparatus, or non-transitory computer-readable medium of any of aspects 1 through 4, where reading the data from the first block of non-volatile memory cells includes operations, features, circuitry, logic, means, or instructions, or any combination thereof for storing the data to a first cache of the memory system, where determining whether the first block is associated with the first block type occurs while the data is stored to the first cache.

Aspect 6: The method, apparatus, or non-transitory computer-readable medium of aspect 5, further including operations, features, circuitry, logic, means, or instructions, or any combination thereof for writing a copy of the data to a second cache of the memory system based at least in part on determining that the first block is associated with the first block type.

Aspect 7: The method, apparatus, or non-transitory computer-readable medium of aspect 6, where writing the data to the second block of non-volatile memory cells includes operations, features, circuitry, logic, means, or instructions, or any combination thereof for reading the copy of the data from the second cache and writing the copy of the data to the second block of non-volatile memory cells.

Aspect 8: The method, apparatus, or non-transitory computer-readable medium of any of aspects 1 through 7, further including operations, features, circuitry, logic, means, or instructions, or any combination thereof for erasing, remapping, or invalidating the first block of non-volatile memory cells based at least in part on writing the data to the second block of non-volatile memory cells.

Aspect 9: The method, apparatus, or non-transitory computer-readable medium of any of aspects 1 through 8, further including operations, features, circuitry, logic, means, or instructions, or any combination thereof for transitioning, by the memory system, from a first power state to a second power state, where reading the data from the first block of non-volatile memory cells occurs upon transitioning from the first power state to the second power state.

Aspect 10: The method, apparatus, or non-transitory computer-readable medium of any of aspects 1 through 9, further including operations, features, circuitry, logic, means, or instructions, or any combination thereof for scheduling the data to be written to the second block of non-volatile memory cells during a second duration based at least in part on determining that the first block is associated with the first block type, where writing the data to the second block of non-volatile memory cells occurs during the second duration.

Aspect 11: The method, apparatus, or non-transitory computer-readable medium of any of aspects 1 through 10, further including operations, features, circuitry, logic, means, or instructions, or any combination thereof for refraining from writing the data to a fourth block of non-volatile memory cells of the memory system based at least in part on determining that the first block is not associated with the first block type.

Aspect 12: The method, apparatus, or non-transitory computer-readable medium of any of aspects 1 through 11, where the first block of non-volatile memory cells includes one or more multi-level cells (MLCs), one or more triple-level cells (TLCs), or one or more quad-level cells (QLCs) and the second block of non-volatile memory cells includes one or more single-level cells (SLCs), one or more multi-level cells (MLCs), one or more triple-level cells (TLCs), or one or more quad-level cells (QLCs).

Aspect 13: The method, apparatus, or non-transitory computer-readable medium of any of aspects 1 through 12, where the first block type includes a production state awareness (PSA) block.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on." or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   one or more memory devices; and
   one or more controllers coupled with the one or more memory devices and configured to cause the apparatus to:
   read data from a first block of non-volatile memory cells of a memory system;
   determine whether the first block is associated with a first block type in accordance with reading the data, wherein the first block type comprises a production state awareness (PSA) block in accordance with the data being written to the first block prior to packaging the one or more memory devices in the memory system;
   transmit the data in accordance with determining whether the first block is associated with the first block type; and
   write the data to a second block of non-volatile memory cells of the memory system in accordance with determining that the first block is associated with the first block type.

2. The apparatus of claim 1, wherein the one or more controllers are further configured to cause the apparatus to:
store a logical block address associated with the data to a portion of the memory system in accordance with determining that the first block is associated with the first block type, wherein the data is written to the second block of non-volatile memory cells in response to storing the logical block address.

3. The apparatus of claim 2, wherein, to write the data to the second block of non-volatile memory cells, the one or more controllers are further configured to cause the apparatus to:
identify, during a first duration, the stored logical block address associated with the data, wherein the memory system is idle during the first duration; and
read, for a second time, the data from the first block of non-volatile memory cells in accordance with the stored logical block address, wherein the data is written to the second block of non-volatile memory cells during the first duration.

4. The apparatus of claim 2, wherein:
the logical block address associated with the data is stored to a list comprising at least a second logical block address associated with second data; and
the data is written to the second block of non-volatile memory cells before the second data is written to a third block of non-volatile memory cells of the memory system based on respective priorities of the data and the second data.

5. The apparatus of claim 1, wherein, to read the data from the first block of non-volatile memory cells, the one or more controllers are further configured to cause the apparatus to:
store the data to a first cache of the memory system, wherein determining whether the first block is associated with the first block type occurs while the data is stored to the first cache.

6. The apparatus of claim 5, wherein the one or more controllers are further configured to cause the apparatus to:
write a copy of the data to a second cache of the memory system in accordance with determining that the first block is associated with the first block type.

7. The apparatus of claim 6, wherein, to write the data to the second block of non-volatile memory cells, the one or more controllers are further configured to cause the apparatus to:
read the copy of the data from the second cache; and
write the copy of the data to the second block of non-volatile memory cells.

8. The apparatus of claim 1, wherein the one or more controllers are further configured to cause the apparatus to:
erase, remap, or invalidate the first block of non-volatile memory cells in response to writing the data to the second block of non-volatile memory cells.

9. The apparatus of claim 1, wherein the one or more controllers are further configured to cause the apparatus to:
transition, by the memory system, from a first power state to a second power state, wherein reading the data from the first block of non-volatile memory cells occurs upon transitioning from the first power state to the second power state.

10. The apparatus of claim 1, wherein the one or more controllers are further configured to cause the apparatus to:
schedule the data to be written to the second block of non-volatile memory cells during a second duration in accordance with determining that the first block is associated with the first block type, wherein writing the data to the second block of non-volatile memory cells occurs during the second duration.

11. The apparatus of claim 1, wherein the one or more controllers are further configured to cause the apparatus to:
refrain from writing the data to a fourth block of non-volatile memory cells of the memory system in accordance with determining that the first block is not associated with the first block type.

12. The apparatus of claim 1, wherein:
the first block of non-volatile memory cells comprises one or more multi-level cells (MLCs), one or more triple-level cells (TLCs), or one or more quad-level cells (QLCs), and
the second block of non-volatile memory cells comprises one or more single-level cells (SLCs), one or more MLCs, one or more TLCs, or one or more QLCs.

13. A non-transitory computer-readable medium storing code comprising instructions which, when executed by a processor of an electronic device, cause the electronic device to:
read data from a first block of non-volatile memory cells of a memory system;
determine whether the first block is associated with a first block type in accordance with reading the data, wherein the first block type comprises a production state awareness (PSA) block in accordance with the data being written to the first block prior to packaging one or more memory devices comprising the first block in the memory system;
transmit the data in accordance with determining whether the first block is associated with the first block type; and
write the data to a second block of non-volatile memory cells of the memory system in accordance with determining that the first block is associated with the first block type.

14. The non-transitory computer-readable medium of claim 13, wherein the instructions, when executed by the processor of the electronic device, further cause the electronic device to:
store a logical block address associated with the data to a portion of the memory system in accordance with determining that the first block is associated with the first block type, wherein the data is written to the second block of non-volatile memory cells in response to storing the logical block address.

15. The non-transitory computer-readable medium of claim 14, wherein the instructions to write the data to the second block of non-volatile memory cells, when executed by the processor of the electronic device, further cause the electronic device to:
identify, during a first duration, the stored logical block address associated with the data, wherein the memory system is idle during the first duration; and
read, for a second time, the data from the first block of non-volatile memory cells in accordance with the stored logical block address, wherein the data is written to the second block of non-volatile memory cells during the first duration.

16. The non-transitory computer-readable medium of claim 14, wherein:
the logical block address associated with the data is stored to a list comprising at least a second logical block address associated with second data; and
the data is written to the second block of non-volatile memory cells before the second data is written to a third block of non-volatile memory cells of the memory system based on respective priorities of the data and the second data.

17. The non-transitory computer-readable medium of claim 13, wherein the instructions, when executed by the processor of the electronic device, further cause the electronic device to:
store the data to a first cache of the memory system, wherein determining whether the first block is associated with the first block type occurs while the data is stored to the first cache.

18. The non-transitory computer-readable medium of claim 17, wherein the instructions, when executed by the processor of the electronic device, further cause the electronic device to:
write a copy of the data to a second cache of the memory system in accordance with determining that the first block is associated with the first block type.

19. A method, comprising:
reading data from a first block of non-volatile memory cells of a memory system;
determining whether the first block is associated with a first block type in accordance with reading the data, wherein the first block type comprises a production state awareness (PSA) block in accordance with the data being written to the first block prior to packaging one or more memory devices comprising the first block in the memory system;
transmitting the data in accordance with determining whether the first block is associated with the first block type; and
writing the data to a second block of non-volatile memory cells of the memory system in accordance with determining that the first block is associated with the first block type.

* * * * *